United States Patent [19]

Aitken

[11] Patent Number: 4,597,358
[45] Date of Patent: Jul. 1, 1986

[54] POWDER SIFTER AND DISPENSER

[76] Inventor: Edward R. Aitken, 2723 Walnut Grove, Rosemead, Calif. 91770

[21] Appl. No.: 579,156

[22] Filed: Feb. 10, 1984

[51] Int. Cl.[4] ............................................. B05C 19/00
[52] U.S. Cl. ...................... 118/24; 209/359; 222/333
[58] Field of Search .............. 209/358, 369, 389; 222/333, 189; 118/24, 25, 308; 366/195, 196

[56] References Cited

U.S. PATENT DOCUMENTS

| | | | |
|---|---|---|---|
| 3,010,615 | 11/1961 | Smith et al. | 222/333 X |
| 3,152,010 | 10/1964 | Case | 118/24 |
| 3,329,318 | 7/1967 | Swett et al. | 222/189 |

OTHER PUBLICATIONS

BE-MO Flavoring Applicators, *Chipper Snacker*, 1/83, p. 82.
UNI-Spense Dry Ingredient Distributor, *Chipper Snacker*, 1/83, p. 42.
UNI-Spense Conveyor Belt Salter, *Chipper Snacker*, 1/83, p. 88.

*Primary Examiner*—John P. McIntosh
*Attorney, Agent, or Firm*—Sheldon & Mak

[57] ABSTRACT

A dispensing apparatus for metering, sifting and feeding powder comprises a vertical duct with a single, screen-covered outlet at the bottom and a rotary agitator having solid fingers separated by radiused notches on a vertical shaft above the screen. The fingers, which do not contact the screen, are one-twentieth to one-tenth inch thick with square edges. The agitator is driven by a sealed motor mounted at the top of the duct in line with the shaft. Powder is fed to the screen through a downwardly sloping branch duct.

12 Claims, 3 Drawing Figures

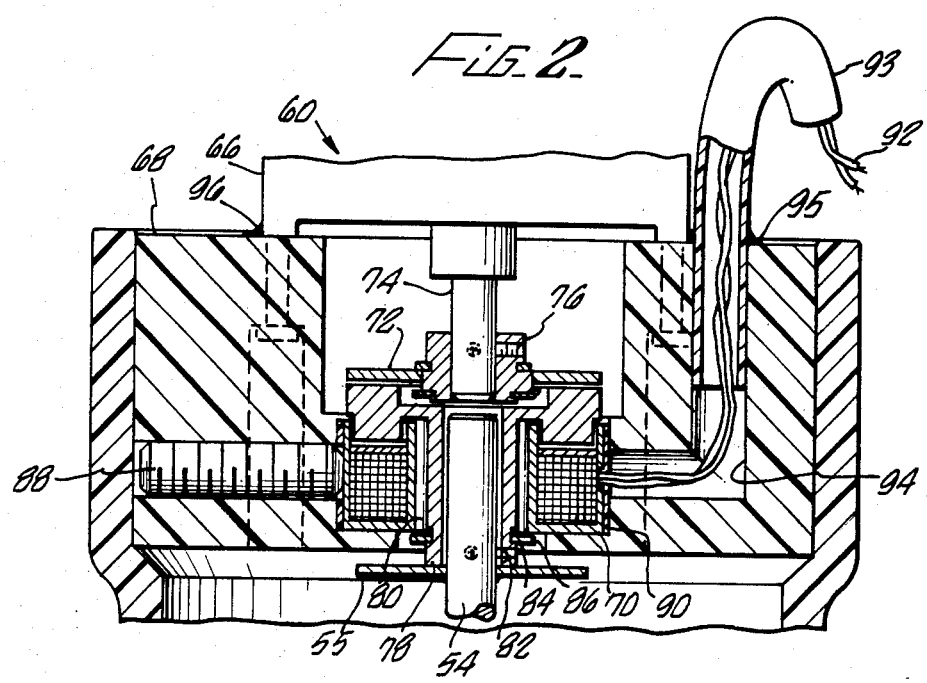
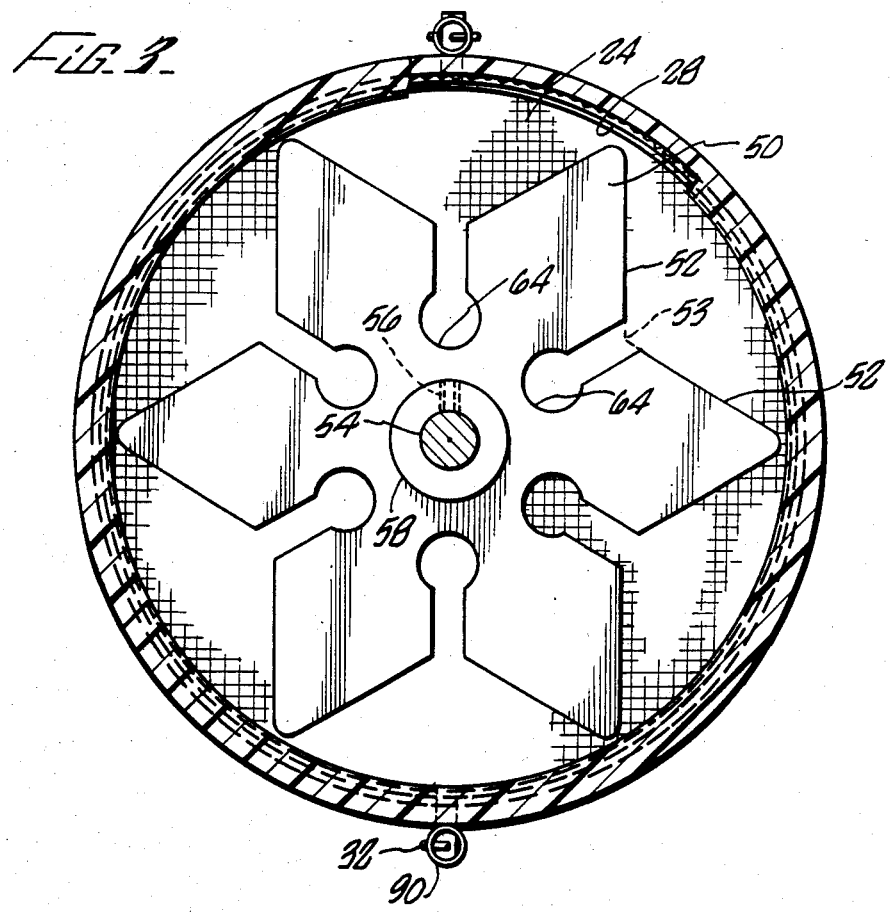

POWDER SIFTER AND DISPENSER

BACKGROUND

The present invention relates to an apparatus for metering, sifting and feeding a powder, such as for the application of powdered seasoning to the outside surface of a processed food product.

Apparatus commonly used for the application of powdered seasoning to processed food dispenses the powder over the path of a conveyor transporting the food. One such apparatus is described in U.S. Pat. No. 3,152,010 issued to W. W. Case. The Case patent discloses a substantially planar agitator comprising a plurality of heart-shaped wire lobes rotated on a vertical shaft within a cylindrical hopper having a perforate bottom. The lobes are biased into contact with the perforate bottom. A series of connecting shafts and universal joints, and a mechanical speed control connect the agitator to a motor horizontally mounted to the side of the hopper.

A version of the Case apparatus presently manufactured by Be-Mo Machine Co. avoids the universal joints by using a right angle gear drive. The agitator is driven by a right-angle bevel gearbox within the hopper, connected by a horizontal shaft passing through the wall of the hopper to a one-third horsepower motor equipped with a mechanical speed control. An electrically operated clutch, within the mechanical speed control, disconnects the agitator drive when conveyor operation is halted.

A disadvantage of these prior art devices is that stray powder accumulates in and clogs the motor, speed control, clutch and related agitator drive components, resulting in a significant loss of productivity due to downtime for daily cleaning of the drive.

Another disadvantage of these prior art devices is the low efficiency of the angled drive power train through the wall of the hopper to the agitator. This results in a requirement for a large, bulky motor that is expensive, hard to control, and wasteful of electrical power.

Another disadvantage of these prior art devices is the presence of wearing drive components within the hopper, and wear between the agitator and the perforate hopper bottom, resulting in contamination of the powder by metal particles and lubricant.

Another disadvantage of these prior art devices is that the wire lobes of the agitator, flexing in contact with the hopper bottom, often fracture after a period of use necessitating frequent disassembly and repair or replacement of the agitator.

A further disadvantage of these prior art devices is that the additional power required to operate the agitator in rubbing contact with the screen compounds the requirement for a large, bulky, expensive motor.

Thus, there is a need for apparatus to meter, sift, and feed powder that is inexpensive, does not permit stray powder to clog the components of the drive, does not contaminate the powder, and is not subject to frequent mechanical failure of the agitator.

SUMMARY OF THE INVENTION

The present invention is directed to a dispenser which meets these needs. The dispenser has a solid non-contact agitator and a small, efficient sealed motor drive in line with the agitator shaft to reduce manufacturing and operating costs and to eliminate expensive down-time for cleaning and repair.

The dispenser comprises (1) a main vertical duct having an outlet at the bottom covered with a removable screen, (2) a slanted branch duct having an inlet at the top, intersecting the main duct to feed powder onto the screen, and (3) an agitator rotatably driven by a vertical shaft above the screen. The shaft extends above the branch intersection and is driven by a drive located at the top of the main duct.

Preferably, the agitator comprises solid radiating fingers which are fastened perpendicular to the shaft close to, but not in contact with the screen.

Preferably, the agitator fingers have squared edges for enhanced agitation in the absence of contact with the screen.

Preferably, the drive comprises a clutch within a housing, the clutch being coupled between the agitator shaft and an enclosed gear motor. The clutch can be operated by an external signal to engage the agitator when it is desired to dispense powder. The motor is mounted to the housing and sealed to exclude powder from the clutch and motor. The speed of the motor may be controlled externally to adjust the flow rate of the powder.

Because of the solid, non-contact agitator and the small, efficient, sealed motor drive in line with the agitator shaft, the dispenser of the present invention satisfies the requirements of lower manaufacturing and operating costs, elimination of powder contamination by metal particles and lubricant, and reduced down-time for cleaning and repair.

DRAWINGS

These and other features, aspects and advantages of the present invention will become better understood with reference to the following description, appended claims and accompanying drawings where:

FIG. 2 is an enlarged sectional view of the dispenser of FIG. 1 within region 2; and FIG. 3 is an enlarged horizontal sectional view of the dispenser of FIG. 1 taken along line 3—3 of FIG. 1.

DESCRIPTION

Figure 1:
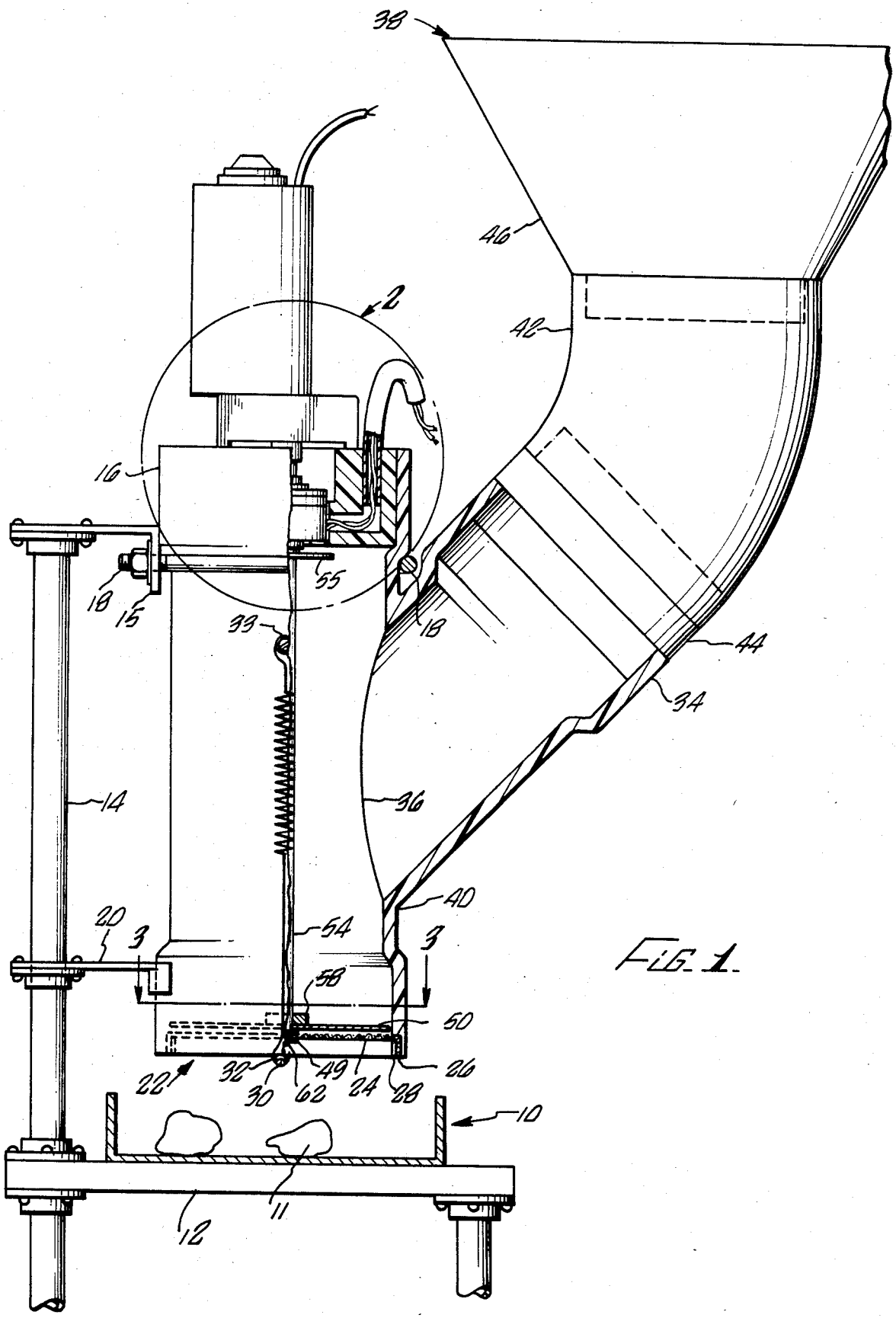
FIG. 1 shows a fragmentary elevational view of a powder dispenser according to the present invention.

With reference to FIG. 1, a conveyor 10 for advancing processed food 11 includes a support structure 12 having an extenson 14 on which an angle member 15 is attached above the conveyor 10. A main vertical duct 16, positioned above the path of the advancing food, is clamped by a shackle 18 to the angle member 15 and steadied by brace 20 which is attached to the extension 14.

The main duct 16 has a bottom outlet 22 covered by a removable screen 24, the screen being retained within a counterbore 26 in the bottom of the duct by a ring 28. A pair of pins 30 are fastened to the lower surface of the ring 28, on opposite sides, and are downwardly sloping and radially extending beyond the outside of the main duct. A pair of spring hooks 32, fastened to the main duct 16 above the pins by a pair of screws 33, engage the pins to hold the ring and screen in position.

A sloping branch duct 34 joins the main duct at an intersection 36. The inlet 38 of the branch duct is located above the intersection to permit powder to be loaded onto the screen through the ducts 34 and 16.

In a preferred embodiment, the main and branch ducts are cylindrical, comprising an assembly of standard 4 inch pipe fittngs, although the size chosen is a function of the scale of the application. A Y-fitting 40 forms main duct 16 and a portion of branch duct 34; the Y-fitting 40 is modified by the counterbore 26. Elbow 42 is joined to the wye by coupling 44 to extend the branch duct. The ends of coupling 44 are modified by light sanding to facilitate disassembly for cleaning. The branch duct further comprises a funnel 46 connected to the top of the elbow to form the inlet 38.

With reference to FIGS. 1 and 3, an agitator 50 comprising fingers 52 is located immediately above the screen 24. The agitator is mounted to a shaft 54 by means of a set-screw 56 in a hub 58 welded to the agitator. The shaft 54 is fixedly connected at its top to a drive 60. When the shaft 54 is driven by the drive, the agitator rotates to agitate the powder loaded onto the screen, thereby permitting the powder to fall through the screen to the food 20 passing below.

Preferably, the agitator 50 is located near the screen 24 without contacting it.

In a preferred embodiment, a ring 55 is fixedly attached to the shaft 54 in position to contact the drive when the agitator 50 is located slightly above the screen.

In a preferred embodiment, the lower end of the agitator shaft forms a journal 62 which fits in a grommet 49, the grommet being installed in the screen 24. The grommet acts as an auxiliary bearing for the shaft.

In a preferred embodiment, the fingers 52 of the agitator are solid, formed as a unit approximately one-twentieth to one-tenth inch thick. A series of notches 53 define tapered sides of the fingers, which are separated by radiused slots 64. The edges of the fingers are square, rather than sharpened, for the generation of turbulence to enhance the agitation of the powder between the agitator and the screen. This combination provides a relatively large effective area of agitation, adequate strength, and a minimum of power wasted during operation. One of the notches 64 is positioned in line with the setscrew 56 to provide access to the setscrew from below the outlet 22 when the screen 24 is removed.

With reference to FIGS. 1 and 2, the drive 60 comprises a motor 66 mounted to a housing 68. Within the housing is a clutch 70. The clutch 70 has a disk 72 fixed to the motor shaft 74 by means of a pair of setscrews 76. The driven rotor 78 of the clutch turns in a bearing 80 and is fixed to the agitator shaft 54 by means of a pair of setscrews 82.

In a preferred embodiment, the ring 55 in contact with the drive is large enough to shield the bottom of the clutch 70. When it is desired to wash the inside of the main duct 16 by directing a stream of wash upward into the outlet 22, the ring 55 prevents direct impingement of wash onto the clutch.

Preferably the motor 66 is an enclosed reduction gearmotor which is not ventilated. The unventilated enclosure excludes stray powder from the motor. The reduction gearing permits the desired speed of the agitator to be maintained with a small, inexpensive, one-thirtieth horsepower motor which is easily controlled. The motor includes a variable speed control (not shown) for adjusting the rate of dispensing the powder.

In a preferred embodiment, the clutch 70 is a commercial unit supplied by Warner Electric, Inc., modified to reduce the end clearence of the bearing 80 on the output rotor 78 having a groove 84. A retaining ring 86 replaces a similar ring supplied with the unit, the ring 86 having a thickness sufficient to reduce the end clearance of the output rotor to reduce the effect of vertical reaction forces of powder at the agitator on the operating characteristics of the clutch.

Preferably the clutch 70 is secured within the housing 68 by a setscrew 88 and sealed in place with a sealing compound 90. The clutch has coil leads 92 which are fed through a passage 94. The leads 92 are protected by a flexible tube 93 inserted into the passage 94 and sealed with a sealing compound 95.

Preferably a sealing compound 96 is applied at the joint between the enclosure of the motor and the housing.

In operation, the totally enclosed and sealed drive excludes powder whether spilled from above or suspended in the air within the main duct. The housing 68 and the clutch bearing 80 form a labyrinth seal with the rotor 78, the retaining ring 86 and the ring 55. The labyrinth seal is effective to exclude powder because there is no other ventilation to the drive that would permit air (and suspended powder) to circulate through the labyrinth.

An advantage of the present invention is that the drive is totally enclosed and sealed to prevent powder from clogging the drive.

Another advantage of the present invention is that the square edges of the agitator fingers permit effective agitation without contact between the agitator and the screen, to prevent metal particle contamination of the powder.

Another advantage of the present invention is that the non-contact agitator with the solid fingers is not subject to wear and fatigue resulting in breakage after a period of operation.

Another advantage of the present invention is that the non-contact agitation and the location of the drive in line with the agitator combine to provide improved efficiency over conventional systems having either a right angle drive or angled shafts coupled with universal joints. This results in the practicality of a smaller, less expensive drive and reduced power consumption. This advantage permits the use of a motor of one-tenth the power rating of the prior art motors in a dispenser having the same nominal capacity.

Although the present invention has been described in considerable detail with reference to certain preferred versions thereof, other versions are possible. For example, a flexible, contacting shaft seal could be used between the drive housing and the agitator shaft in place of the labyrinth seal. Therefore, the spirit and scope of the appended claims should not necessarily be limited to the description of the preferred versions contained herein.

What is claimed is:

1. An apparatus for metering, sifting and feeding a powder, the apparatus comprising:
   (a) a main vertical duct with an outlet at its bottom;
   (b) a downwardly slanted branch duct for feeding powder into the main duct, the branch duct intersecting the main duct between the top and the bottom of the main duct, the inlet of the slanted duct being above the intersection;
   (c) a screen covering the outlet for sifting the powder;
   (d) an agitator above the screen for agitating the fed powder to permit the powder to fall through the screen, the agitator comprising a plurality of broad fingers having co-planar top and bottom surfaces, the fingers being located near the screen without contacting the screen;

(e) a drive mounted above the agitator and the intersection for driving the agitator; and (f) a vertical shaft between the drive and the agitator.

2. The apparatus of claim 1 wherein the drive comprises:

(a) a housing;

(b) a motor mounted to the housing; and (c) sealing means to exclude stray powder from the drive.

3. The apparatus of claim 2 wherein the drive further comprises a clutch within the housing to rotate the shaft and thus drive the agitator in response to an external signal.

4. The apparatus of claim 2 wherein the motor is an enclosed reduction gearmotor.

5. The apparatus of claim 4 wherein the motor comprises a variable speed control for adjusting the rate of dispensing the powder.

6. The apparatus of claim 1 wherein the fingers further comprise vertical side edges squarely intersecting the top and bottom surfaces for enhancing the agitation of the powder.

7. The apparatus of claim 6 wherein the agitator comprises a notched solid member having radiused slots extending toward the shaft for increasing the effective area of the agitator while providing high strength and fatigue resistance.

8. The apparatus of claim 1 wherein the main duct and the branch duct comprise a Y-pipe fitting.

9. The apparatus of claim 8 wherein the branch duct further comprises an elbow fitting coupled to the Y-pipe fitting.

10. The apparatus of claim 1 wherein the top and bottom surfaces of the fingers are opposite sides of a solid member, the solid member being approximately one-twentieth to one-tenth inch thick.

11. An apparatus for metering, sifting and feeding a powder, the apparatus comprising:

(a) a duct having an inlet for powder and a vertical portion with an outlet at the bottom;

(b) a screen covering the outlet for sifting the powder;

(c) a vertical shaft rotatably mounted within the duct above the screen;

(d) a motor for driving the shaft; and (e) an agitator comprising a plurality of solid fingers having co-planar top and bottom surfaces, the fingers being mounted perpendicularly to the shaft near, but not contacting, the screen the fingers being capable of agitating the powder to permit the powder to fall through the screen without contact between the fingers and the screen.

12. An apparatus for metering, sifting and feeding a powder, the apparatus comprising:

(a) a main vertical duct with an outlet at the bottom;

(b) a downwardly slanted branch duct for feeding powder into the main duct, the branch duct intersecting the main duct between the top and the bottom of the main duct, the inlet of the slanted duct being above the intersection;

(c) a screen covering the outlet for sifting the powder;

(d) an agitator above the screen, but not contacting the screen, for agitating the fed powder to permit the powder to fall through the screen, the agitator comprising a vertical drive shaft having a solid plane member notched to form tapered fingers, the plane member being perpendicular to the longitudinal axis of the shaft, the notches being extended toward the shaft by radiused slots for increasing the effective area of the agitator while providing high strength and fatigue resistance, the fingers having co-planar top and bottom surfaces and vertical side edges squarely intersecting the top and bottom surfaces for agitating the powder to permit the powder to fall through the screen without contact between the fingers and the screen; and (e) a drive mounted at the top of the vertical duct for driving the agitator, the drive comprising:

(i) a housing;

(ii) a clutch within the housing to drive the drive shaft in response to an external signal.

(iii) an enclosed reduction gearmotor mounted to the housing and coupled to the clutch; and (iv) a seal cooperating with the housing and enclosure to exclude powder from the components of the drive.

* * * * *